US010036273B2

(12) United States Patent
Kozuch et al.

(10) Patent No.: US 10,036,273 B2
(45) Date of Patent: Jul. 31, 2018

(54) BLEED VALVE

(71) Applicant: ROLLS-ROYCE PLC, London (GB)

(72) Inventors: Michael Georg Kozuch, Derby (GB); Zahid Muhammad Hussain, Derby (GB); Kevin Mark Britchford, Derby (GB)

(73) Assignee: ROLLS-ROYCE plc, London (GB)

( * ) Notice: Subject to any disclaimer, the term of this patent is extended or adjusted under 35 U.S.C. 154(b) by 350 days.

(21) Appl. No.: 14/881,775

(22) Filed: Oct. 13, 2015

(65) Prior Publication Data

US 2016/0130972 A1 May 12, 2016

(30) Foreign Application Priority Data

Nov. 6, 2014 (GB) .................................. 1419756.0

(51) Int. Cl.
F01D 17/10 (2006.01)
F01D 5/02 (2006.01)
F01D 25/12 (2006.01)
F16K 1/22 (2006.01)
F02K 3/075 (2006.01)
F02C 9/18 (2006.01)
F02C 6/08 (2006.01)

(52) U.S. Cl.
CPC ............. F01D 17/105 (2013.01); F01D 5/02 (2013.01); F01D 25/12 (2013.01); F02C 6/08 (2013.01); F02C 9/18 (2013.01); F02K 3/075 (2013.01); F16K 1/22 (2013.01)

(58) Field of Classification Search
CPC .......... F01D 17/105; F01D 25/12; F01D 5/02; F02C 6/08; F02C 9/18; F02K 3/075; F16K 1/22
See application file for complete search history.

(56) References Cited

U.S. PATENT DOCUMENTS 3,761,042 A 9/1973 Denning
5,119,625 A 6/1992 Glowacki
(Continued)

FOREIGN PATENT DOCUMENTS

EP 1387969 A2 2/2004
GB 1472033 A 4/1977
WO 02/084090 A2 10/2002

OTHER PUBLICATIONS

Apr. 27, 2015 Search Report issued in British Patent Application No. GB1419756.0.
(Continued)

Primary Examiner — Dwayne J White
Assistant Examiner — Adam W Brown
(74) Attorney, Agent, or Firm — Oliff PLC

(57) ABSTRACT

A bleed valve for a gas turbine engine, the bleed valve comprising: an inlet coupled to an air source; and an outlet coupled to an air sink. The bleed valve also comprises a first stage of flow area modulation between the inlet and the outlet. Also a second stage of flow area modulation between the first stage and the outlet. The pressure can be equalized between the first and second stages. There is also an arrangement comprising a plurality of bleed valves and a controller to control the flow areas of at least one of the first and second stages of each bleed valve.

18 Claims, 3 Drawing Sheets

(56) References Cited

U.S. PATENT DOCUMENTS

| | | | | |
|---|---|---|---|---|
| 5,182,905 | A | * | 2/1993 | Stransky ............... F02C 7/18 |
| | | | | 60/204 |
| 5,261,228 | A | * | 11/1993 | Shuba ............... F01D 17/105 |
| | | | | 60/226.3 |
| 5,417,391 | A | | 5/1995 | Savitsky et al. |
| 8,430,202 | B1 | * | 4/2013 | Mason ............... F01D 17/105 |
| | | | | 181/210 |
| 9,062,604 | B2 | * | 6/2015 | DeFrancesco ......... B64D 13/08 |
| 2010/0043447 | A1 | | 2/2010 | Kirby |
| 2014/0109589 | A1 | * | 4/2014 | Pritchard, Jr. ......... F02K 3/075 |
| | | | | 60/779 |

OTHER PUBLICATIONS

Mar. 17, 2016 Search Report issued in European Patent Application No. 15189456.

* cited by examiner

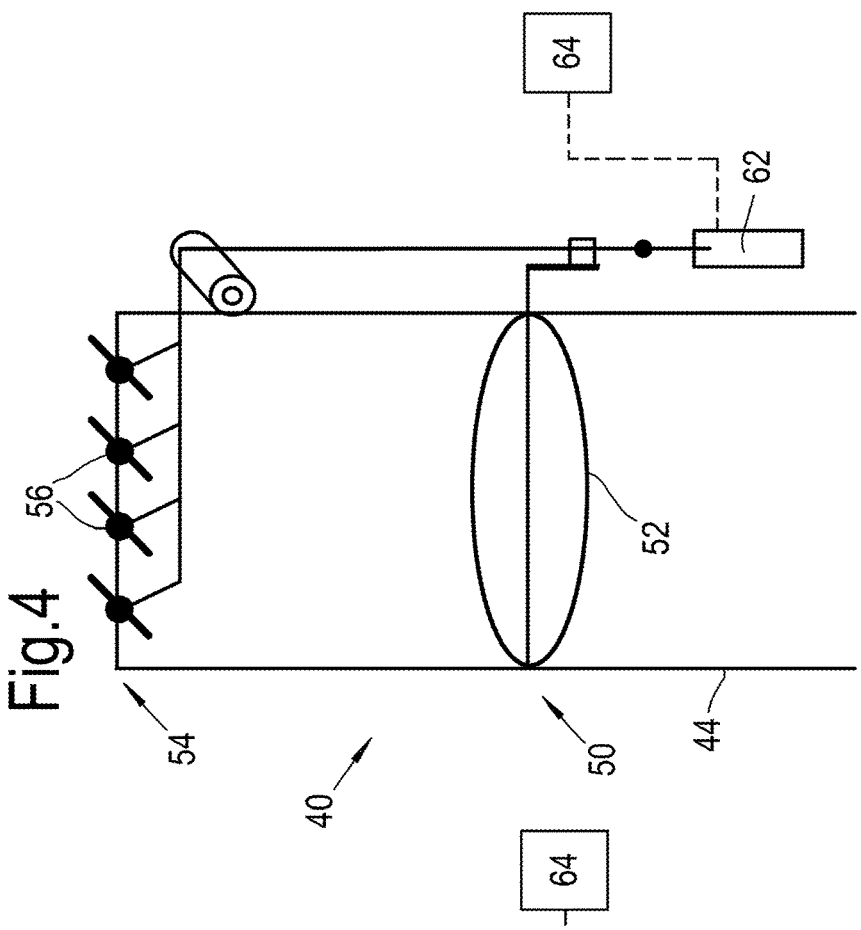
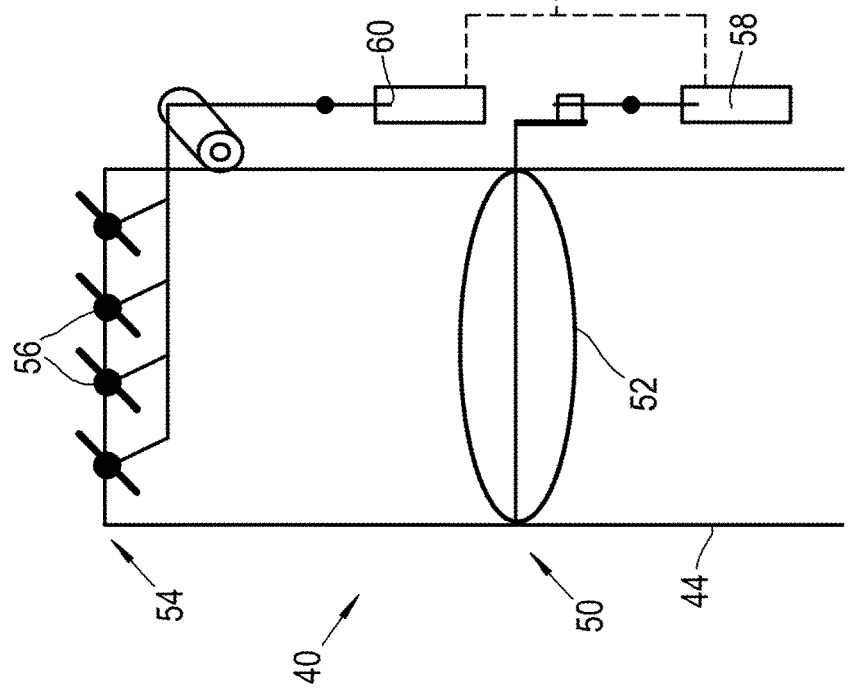

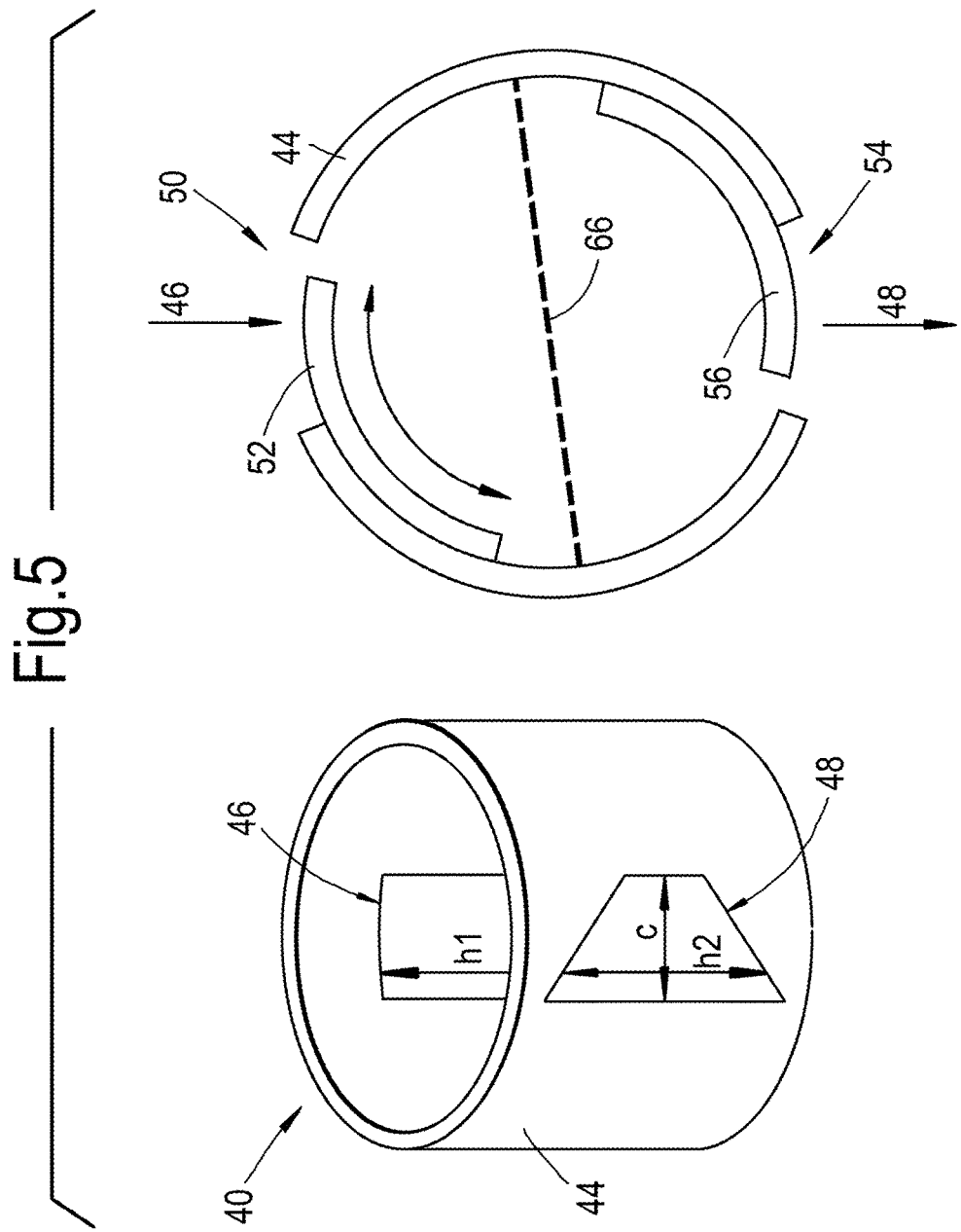

BLEED VALVE

FIELD OF THE INVENTION

The present invention relates to a bleed valve for a gas turbine engine, an arrangement of bleed valves, and a gas turbine engine having at least one bleed valve.

A gas turbine engine is shown in FIG. 1 and has a rotational axis 9. It comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

In use, air is drawn into the air intake 12 and is accelerated by the fan 14. It is split into the two axial flows A, B. In a high bypass ratio gas turbine engine, the majority of the air is passed through the bypass duct 32 to be expelled to give propulsive thrust. The remainder of the air is passed into the core engine (axial flow A) where it is compressed and accelerated by the intermediate pressure compressor 16 and then the high pressure compressor 18. Fuel is injected into the combustor 20 and combusted with the air from the high pressure compressor 18. Hot combustion gases are expelled from the combustor 20. The gases are expanded and slowed through the high pressure turbine 22, intermediate pressure turbine 24 and finally through the low pressure turbine 26 before being expelled through the exhaust nozzle 28 to provide a small amount of the propulsive thrust.

In order to manage the pressure ratio across the compressors 16, 18 away from the design operating conditions it may be beneficial to extract air from an intermediate position in the compressors 16, 18 via one or more bleed valves. When opened, such bleed valves divert a portion of the air flow from the core engine. The extracted air may be used to cool hot components of the engine, for example stator vanes and rotor blades of the turbines 22, 24, 26, provide case cooling for clearance control, or be dumped into the bypass duct 32 or overboard.

Whilst some bleed of air is desirable for pressure ratio management and to supply cooling applications, the amount of air bled through the bleed valves should be minimised as extracted air reduces the efficiency of the gas turbine engine 10 as it is not used as working gas. Where the gas turbine engine 10 powers an aircraft it is also beneficial to minimise bleed off-take because opening the bleed valves and flow through the bleed valves is noisy and therefore causes discomfort to passengers and those overflown by such an aircraft.

Known bleed valves comprise a so-called pepper pot arrangement in which a cylindrical duct is directed radially away from the compressor stage 16, 18. Within the duct is a perforate plate to cause a pressure drop of the air passing through the valve. After an additional duct length there is another perforate plate forming the outlet of the bleed valve which is arranged to minimise the noise generated by the bleed valve, for example by slowing the flow, dispersing it and/or directing it to prevent high speed impact of a jet against a wall in the gas turbine engine 10. The bleed valves comprise control to open or close them to flow from the compressor stage 16, 18.

One disadvantage of known bleed valves is that the amount of flow extracted is stepped, depending on how many of an array of bleed valves are opened. Thus it is often necessary to extract more air than desirable because opening fewer bleed valves would result in an inadequate amount of bleed air being extracted. Disadvantageously the efficiency of the engine is reduced and the noise generated by the bleed valves is increased relative to the desirable levels for given engine operating conditions.

SUMMARY OF THE INVENTION

The present invention provides a bleed valve that seeks to address the aforementioned problems.

Accordingly the present invention provides a bleed valve for a gas turbine engine, the bleed valve comprising:
an inlet coupled to an air source;
an outlet coupled to an air sink;
a first stage of flow area modulation between the inlet and the outlet; and
a second stage of flow area modulation between the first stage and the outlet.

Advantageously the bleed valve provides pressure equalisation between the first and second stages of flow area modulation. Advantageously the bleed valve is quieter than known bleed valves.

The bleed valve may further comprise a controller to control the modulation of the flow area of at least one of the first stage and second stage. Advantageously the bleed valve can therefore be at least partly actively controlled.

The first stage may comprise any of the group comprising: a bi-stable valve that is open or closed; a discretely variable valve that has a plurality of open states; a continuously variable valve; a butterfly valve; a flap valve; a ball valve; a shaped port; one or more louvers. Advantageously the flow area of the first stage is thus continuously or discretely variable.

The second stage may comprise any of the group comprising: a bi-stable valve that is open or closed; a discretely variable valve that has a plurality of open states; a continuously variable valve; a shaped port; one or more louvers; a sliding cover; a variable iris; a temperature controlled shape memory alloy variable area structure; a pressure controlled elastically deformable variable area structure. Advantageously the flow area of the second stage is thus continuously or discretely variable. Advantageously the flow area of the second stage may be different to the flow area of the first stage.

The controller may be configured to equalise the pressure drop across the first stage and the second stage. The controller may be configured to control the first stage and the second stage. Alternatively the controller may be configured to control only one of the first stage and the second stage, the other stage being passively controlled.

The controller may be an active controller. Alternatively the controller may be a passive controller. The controller may be mechanical. The controller may be electrical. The controller may be electronic. The controller may be implemented in software. The controller may be located remotely from the bleed valve. Advantageously it may be located in a more benign location in a gas turbine engine than the bleed valve.

The bleed valve may further comprise a perforate plate between the first stage and the second stage. Advantageously the perforate plate provides an additional pressure drop.

The present invention also provides an arrangement comprising:
a plurality of bleed valves, each as described; and
a controller to control the flow area of at least one of the first and second stages of each bleed valve.

Advantageously this arrangement enables the use of the plurality of bleed valves to be coordinated. There may be more than one controller, the controllers in communication with each other to coordinate actuation of the first and/or second stages of flow area modulation in the bleed valves.

The controller or controllers may be configured to control the flow area of the first and second stages of each bleed valve. Thus both stages of each valve are actively controlled. The controller may be configured to control any number of the plurality of bleed valves to be closed, partially open or fully open. Thus a single controller has overall control of all the bleed valves.

The present invention also provides a gas turbine engine comprising a bleed valve as described; a gas turbine engine comprising an arrangement as described; and a gas turbine engine comprising an array of bleed valves, each bleed valve as described. The array may be an annular array; an axial array; or an array that is annular and axial. The bleed valves in the array may be equally spaced or unequally spaced.

The air source may comprise a compressor stage or a turbine stage. The air sink may comprise a turbine stage; a cooling air reservoir; a bypass duct; or overboard of the gas turbine engine. For example the air may be dumped overboard of the gas turbine engine or may be used to provide thrust by expulsion overboard.

Any combination of the optional features is encompassed within the scope of the invention except where mutually exclusive.

DESCRIPTION OF THE SEVERAL VIEWS OF THE DRAWINGS

The present invention will be more fully described by way of example with reference to the accompanying drawings, in which:

FIG. 3 is a schematic cross section of a bleed valve.

FIG. 4 is another schematic cross section of a bleed valve.

FIG. 5 is a schematic perspective and a schematic cross section of a bleed valve.

DETAILED DESCRIPTION OF THE INVENTION

Figure 1:
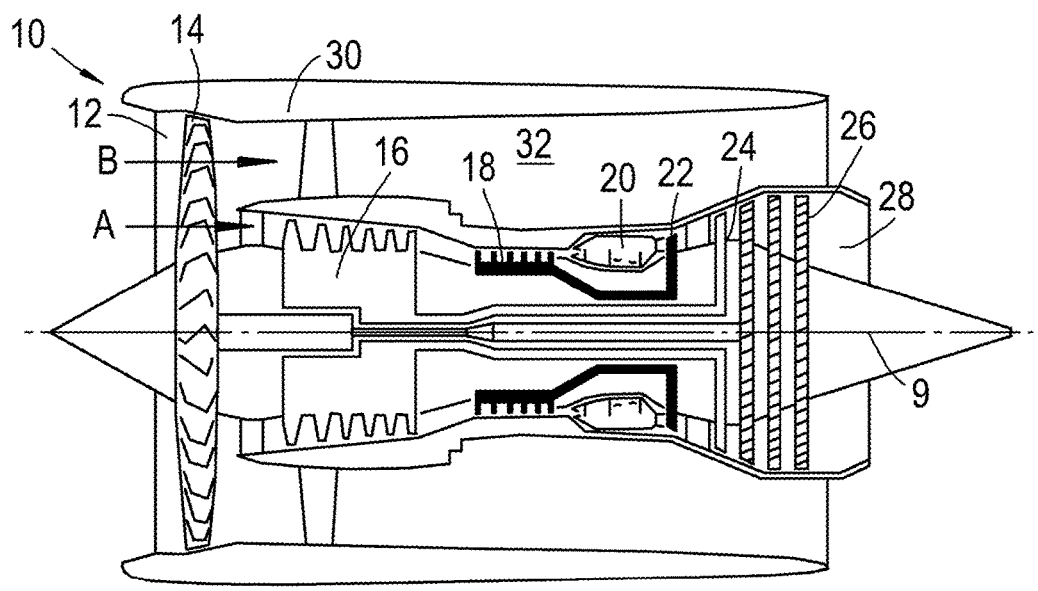
FIG. 1 is a sectional side view of a gas turbine engine in which the bleed valve may be installed.
Figure 2:
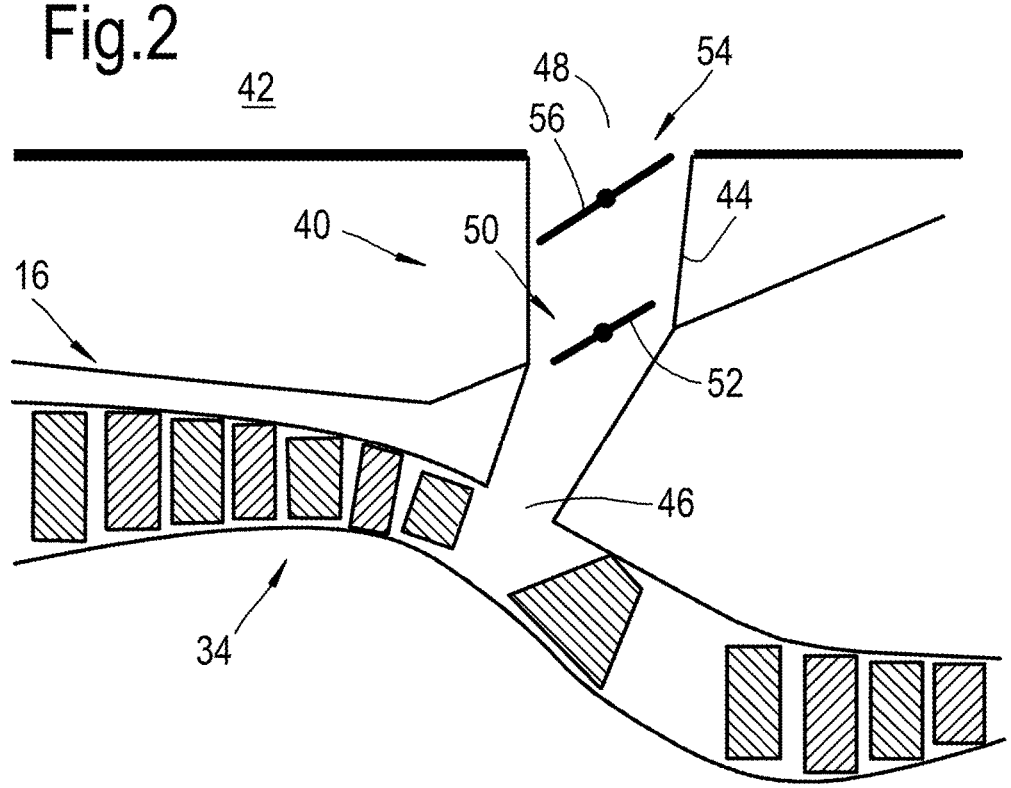
FIG. 2 is a schematic enlargement of part of the gas turbine engine showing a bleed valve.

FIG. 2 is a schematic enlargement of part of a compressor stage 34 in the intermediate pressure compressor 16 of the gas turbine engine 10. A bleed valve 40 is provided to selectively extract air from the compressor stage 34, the air source, and supply it to an air sink 42. The air sink 42 may be the bypass duct 32 or overboard the engine 10. Alternatively the air sink 42 may comprise a cooling system for stages of the turbines 22, 24, 26 or may comprise part of a clearance control arrangement for a turbine or compressor stage.

The bleed valve 40 comprises a housing 44 which is cylindrical and hollow. Thus the housing 44 forms an approximately cylindrical duct. The housing 44 may be arranged so that the axis of symmetry extends radially from the compressor stage 34 or may be angled with an axial and/or a circumferential component. If the housing 44 is angled axially it is preferably angled axially downstream with respect to air flow through the gas turbine engine 10. In some embodiments it may however be preferable for the housing 44 to be angled axially upstream with respect to the air flow through the gas turbine engine 10. If the housing 44 is angled circumferentially it may be angled in the same direction as or in the opposite direction to the direction of rotation of the rotor blades of the compressor stage 34.

The bleed valve 40 has an inlet 46. The inlet 46 is located at the radially inner end of the housing 44 and, directly or indirectly, couples the bleed valve 40 to the air source, compressor stage 34. The inlet 46 may be parallel to the rotational axis 9 of the gas turbine engine 10 or may be angled so that the axially forward portion of it is closer to the rotational axis 9 of the gas turbine engine 10 than the axially rearward portion of it, or may be angled so that the axially forward portion of it is further from the rotational axis 9 of the gas turbine engine 10 than the axially rearward portion of it.

The bleed valve 40 also has an outlet 48. The outlet 48 is located at the radially outer end of the housing 44 and, directly or indirectly, couples the bleed valve 40 to the air sink 42. The outlet 48 may be parallel to the rotational axis 9 of the gas turbine engine 10 or may be angled so that the axially forward portion of it is closer to the rotational axis 9 of the gas turbine engine 10 than the axially rearward portion of it, or may be angled so that the axially forward portion of it is further from the rotational axis 9 of the gas turbine engine 10 than the axially rearward portion of it. The outlet 48 may be aligned with the radially inner surface of the bypass duct 42.

The bleed valve 40 also includes a first stage 50 of flow area modulation. The first stage 50 is located within the duct formed by the housing 44 and is between the inlet 46 and the outlet 48. The first stage 50 comprises one or more elements or valve members 52 which modulate the flow area when actuated. For example the valve members 52 may comprise butterfly valve members, which are flaps hinged centrally that rotate from a closed position aligned with adjacent static structure of the first stage 50 to an open position in which air can pass between the adjacent static structure and the flap on either side of the hinge. Alternatively the valve members 52 may comprise an array of louvers, which resemble flaps that are hinged at one end and rotate from a closed position aligned with adjacent static structure of the first stage 50, or abutted to adjacent static structure and/or louvers, to an open position in which air can pass between adjacent louvers. The louvers may span the whole diameter of the housing 44 or there may be static structure between adjacent louvers or between the louvers and the housing 44.

The valve members 52 of the first stage 50 of flow area modulation may be configured as bi-stable valves, that is they are either closed or open. Alternatively the valve members 52 may be configured as discretely variable valves, that is they have a plurality of defined open states which therefore provide a discrete number of flow area options. Such valve members 52 may or may not include a closed state. Alternatively the valve members 52 may be configured as continuously variable valves, that is they can be opened to any extent limited only by the mechanical limits of the actuation.

The first stage 50 may comprise only one valve member 52 or may comprise an array of valve members 52. Where there is an array of valve members 52 they may be coupled together to be actuated in concert. Alternatively they may be actuated individually and controlled individually or collectively.

The bleed valve 40 also has a second stage 54 of flow area modulation. The second stage 54 is located within the duct formed by the housing 44 and is between the first stage 50 and the outlet 48. The second stage 54 comprises one or more elements or valve members 56 which modulate the flow area when actuated. For example the valve members 56 may comprise an array of louvers, which resemble flaps that are hinged at one end and rotate from a closed position aligned with adjacent static structure of the second stage 54, or abutted to adjacent static structure and/or louvers, to an open position in which air can pass between adjacent louvers. The louvers may span the whole diameter of the housing 44 or there may be static structure between adjacent louvers or between the louvers and the housing 44. Alternatively the valve members 56 may comprise butterfly valve members, which are flaps hinged centrally that rotate from a closed position aligned with adjacent static structure of the second stage 54 to an open position in which air can pass between the adjacent static structure and the flap on either side of the hinge.

The valve members 56 of the second stage 54 of flow area modulation may be configured as discretely variable valves, that is they have a plurality of defined open states which therefore provide a discrete number of flow area options. Such valve members 56 may or may not include a closed state. Alternatively the valve members 56 may be configured as continuously variable valves, that is they can be opened to any extent limited only by the mechanical limits of the actuation. Alternatively the valve members 54 may be configured as bi-stable valves, that is they are either closed or open.

The second stage 54 may comprise only one valve member 56 or may comprise an array of valve members 56. Where there is an array of valve members 56 they may be coupled together to be actuated in concert. Alternatively they may be actuated individually and controlled individually or collectively.

In an embodiment the first stage 50 of flow area modulation comprises a small number, for example one or two, valve members 52 which span the majority of the diameter of the housing 44. Thus the valve members 52 may be butterfly valves each being relatively wide. The second stage 54 of flow area modulation comprises a larger number, for example eight to twelve, valve members 56 which span all or most of the diameter of the housing 44. Thus the valve members 56 may be louvers, each having relatively small extent.

The bleed valve 40 is arranged so that at least one of the first stage 50 and second stage 54 of flow area modulation has a closed state to prevent any flow through the bleed valve 40. Both the first stage 50 and the second stage 54 may comprise bi-stable valve members 52, 56. However, more preferably one or both of the first stage 50 and second stage 56 comprise discretely or continuously variable valve members 52, 56. The valve members 52 of the first stage 50 may be of the same type as the valve members 56 of the second stage 54. Alternatively, they may be of a different type.

The flow area of the first stage 50 and second stage 54 may be controlled, by modulating the positions of the valve members 52, 56, in order to equalise the pressure drop across the first stage 50 and the second stage 54. Advantageously equalising the pressure drop across the two stages 50, 54 reduces the probability that either stage will choke and therefore minimises the noise produced by the bleed valve 40.

As shown in FIG. 3, the valve member 52 of the first stage 50, shown as a single butterfly valve, may be coupled to a first stage actuator 58. The first stage actuator 58 acts to rotate the valve member 52 about its axis from horizontal, where it is aligned with the diameter of the housing 44 and therefore fills the duct of the bleed valve 40, to vertical where it is perpendicular to the diameter of the housing 44 and therefore offers the least resistance to flow through the duct formed by the housing 44 of the bleed valve 40. Alternatively the range of rotation of the butterfly valve member 52 may be reduced so that it does not close fully, does not open fully, or neither opens nor closes fully.

The valve members 56 of the second stage 54, shown as an array of butterfly valves, are coupled together. A second stage actuator 60 is coupled to the array of butterfly valve members 56 to cause them to rotate in unison, each about its own axis. Thus the valve members 56 rotate from substantially horizontal, where their edges abut or overlap to reduce or prevent flow from passing through the bleed valve 40, to substantially vertical, where they are perpendicular to the diameter of the housing 44 and therefore offer least resistance to flow through the bleed valve 40. Alternatively the range of rotation of the array of butterfly valve members 56 may be reduced so that they do not close fully, do not open fully, or neither open nor close fully.

FIG. 4 is similar to FIG. 3. However, instead of the first stage actuator 58 and second stage actuator 60 there is a common actuator 62. The common actuator 62 is arranged or configured to actuate the rotation of the first stage valve member 52 and the second stage valve members 56. The valve members 52, 56 are coupled together in such a way that there is a desirable relationship between the amount of flow permitted through the first stage 50 and the amount of flow permitted through the second stage 54. The relationship may be linear, that is that the rate of increase in flow area per unit of actuation is the same for the first stage 50 and second stage 54, or it may be non-linear, meaning that the flow area through the second stage 54 increases faster or slower than the flow area through the first stage 50 per unit of actuation. The relationship between the stages 50, 54 may also be arranged so that there is a delay between the valve member 52 of the first stage 50 moving from closed to an open state and the valve members 56 of the second stage 54 beginning to rotate from their closed (or least open) state.

The bleed valve 40 may comprise or be coupled to a controller 64, as shown in FIG. 3 or FIG. 4. The controller 64 is arranged or configured to control the first stage actuator 58 and second stage actuator 60, or to control the common actuator 62.

In another embodiment of the bleed valve 40 the valve member or valve members 52 of the first stage 50 of flow area modulation are actuated by the first stage actuator 58 which is controlled by the controller 64. The valve member or valve members 56 of the second stage 54 of flow area modulation are not coupled to an actuator 60, 62 or the controller 64. Instead the valve member or valve members 56 are arranged to move in response to the amount of flow directed towards them from the first stage 50. Thus this arrangement is partially passive in that the second stage 54 is not actively controlled but passively reacts to the conditions set by the first stage 50. Alternatively the controller 64 may be arranged to control the second stage actuator 60 and the valve member or valve members 52 of the first stage 50 may be configured or arranged to react passively to the conditions set by the second stage 54. Hence the controller 64 is arranged to control only one of the first and second stages 50, 54.

The controller 64 may be an active controller. Thus it may actively generate a control signal or other means to cause the actuators 58, 60, 62 to actuate the valve members 52, 56 of the first stage 50, second stage 54 or both the first and second stages 50, 54. Alternatively the controller 64 may be a passive controller. Thus it may react to a change in conditions of the engine 10, for example a pressure difference, in order to provide the control signal to the actuators 58, 60, 62.

The controller 64 may be mechanical, comprising moving parts that are coupled to the actuator or actuators 58, 60, 62. Alternatively the controller 64 may be electrical or electronic and generate electrical or electronic signals to be transmitted to the actuator or actuators 58, 60, 62 via wires. The controller 64 may be implemented in software and may comprise a function of an engine controller or be linked to such an engine controller. Advantageously the controller 64 therefore actuates the valve members 52, 56 of the bleed valve 40 when required by particular engine conditions or states governed by the engine controller.

The controller 64 may be collocated with the bleed valve 40. Advantageously there is no delay in transmission of control signals from the controller 64 to the actuator or actuators 58, 60, 62 of the bleed valve 40, and component weight is minimised because there is no need for long mechanical couplings. Alternatively the controller 64 may be located remotely from the bleed valve 40, for example on the core engine casing or fan case. Where the controller 64 is linked to or forms a function of the engine controller this will already be located remotely from the bleed valve 40. Advantageously the controller 64 can be located in a cool part of the engine 10 where it does not disrupt airflow through the engine 10 or through the bleed valve 40.

In a gas turbine engine 10 there may be a plurality of bleed valves 40, arranged as an annular array around the circumference of a compressor stage 34. For example there may be up to four bleed valves 40 arranged in an annular array around the circumference of the compressor stage 34. The bleed valves 40 may be equi-angularly spaced or may be unequally spaced around the compressor stage 34, for example to accommodate other components mounted around the compressor stage 34. There may be more than one array of bleed valves 40, each array axially spaced from any other array of bleed valves 40. The bleed valves 40 within each array may be circumferentially displaced relative to bleed valves 40 in adjacent arrays. There may be an array of bleed valves 40 which extends both annularly and axially.

Thus an aspect also comprises an arrangement comprising a plurality of bleed valves 40 and a controller 64. The controller 64 is arranged to control the flow area of the first stage 50 of each of the bleed valves 40, or is arranged to control the flow area of the second stage 54 of each of the bleed valves 40, or is arranged to control the flow area of both the first and second stages 50, 54 of each of the bleed valves 40. Alternatively, the controller 64 could be arranged to control the flow area of the first stage 50 of some of the bleed valves 40 and the second stage 54 of the other bleed valves 40. In some applications each of the plurality of bleed valves 40 is substantially identical. In other applications the bleed valves 40 may differ from each other. For example, one or more of the bleed valves 40 may include a first stage 50 formed as a butterfly valve; one or more of the bleed valves 40 may include a first stage 50 formed as a discretely variable valve; and one or more of the bleed valves 40 may include a first stage 50 formed as one or more louvers. Similarly one or more of the bleed valves 40 may include a second stage 54 formed as a butterfly valve; one or more of the bleed valves 40 may include a second stage 54 formed as a discretely variable valve; and one or more of the bleed valves 40 may include a second stage 54 formed as one or more louvers. Each bleed valve 40 may comprise the same type of valve members 52, 56 for the first stage 50 and second stage 54.

The controller 64 for the arrangement may comprise more than one sub-controller, each of which controls the flow area of the first stage 50, second stage 54 or both stages 50, 54 of one or more bleed valves 40 forming a subset of the plurality of bleed valves 40. The sub-controllers are in communication with each other so that the control of the bleed valves 40 is coordinated. The bleed valves 40 may be preferentially opened to control the noise profile. Alternatively the controller 64 has overall control of the sub-controllers.

Each of the bleed valves 40 forming the plurality of bleed valves 40 is individually controlled to be closed, partially open or fully open. Thus in some operating conditions of the engine 10 all the bleed valves 40 will be controlled to their closed states. In other operating conditions of the engine 10 all the bleed valves 40 will be controlled to their fully open states. In other, intermediate, operating conditions some of the bleed valves 40 will be controlled to closed, whilst others are controlled to partially or fully open states. In still other intermediate operating conditions all the bleed valves 40 will be controlled to partially open states but the extent to which each bleed valve 40 is controlled to open may or may not be the same as others of the plurality of bleed valves 40.

FIG. 5 shows a bleed valve 40. The housing 44 is cylindrical and hollow as before. However, it is arranged so that the axis of symmetry of the cylinder is perpendicular to the engine radius. The axis of symmetry may be parallel to the engine rotational axis 9 or perpendicular thereto.

The housing 44 of the bleed valve 40 comprises two shaped openings which form the inlet 46 and outlet 48. The shape of the inlet 46 may be the same or different to the shape of the outlet 48. The enclosed area of the inlet 46 may be the same as, smaller or larger than the enclosed area of the outlet 48.

Close to the inlet 46, inside the housing 44, is a first curved plate forming the valve member 52 of the first stage 50 of flow area modulation. The first curved plate 52 is shaped to complement the interior surface of the housing 44 in the vicinity of the inlet 46. The first curved plate 52 is preferably adjacent to the interior surface of the housing 44, with a clearance for movement of the first curved plate 52 relative to the housing 44. The first curved plate 52 may have a shape that complements the shape of the aperture in the housing 44 that forms the inlet 46. Alternatively, it may be larger than the inlet 46 or be smaller than the inlet 46, in which case the first stage 50 does not have a closed state. Alternatively the first curved plate 52 may have a different shape to the inlet 46.

The first curved plate 52 is further configured to be moved on a curved path defined about an axis coincident with the axis of symmetry of the housing 44. The first curved plate 52 can therefore be orientated in a position in which it does not obstruct the inlet 46 so that the flow area of the first stage 50 is maximised. The first curved plate 52 can also be orientated in a position in which it fully obstructs the inlet 46 so that the first stage 50 permits no flow to pass therethrough. The first curved plate 52 can be moved around its curved path, for example driven by a first stage actuator 58, from the position in which it does not obstruct the inlet 46 to the position in which it fully obstructs the inlet 46 in order to modulate the available flow area. Intermediate positions of the first curved plate 52 around its travel path therefore offer reduced flow area.

The movement of the first curved plate 52 around its path may be limited by end stops or by the actuation applied to it in order to reduce the range of flow area modulation provided. Alternatively, where the first curved plate 52 is smaller than the inlet 46, in at least one of the axial and circumferential directions relative to the cylindrical housing 44, there may be no position of the first curved plate 52 in which the first stage 50 is in a closed state. Where the first curved plate 52 has a different shape to the inlet 46 the flow area modulation may be non-linearly related to the position of the first curved plate 52. In this example the first stage 50 may include a closed state or may not include a closed state depending on the shapes of the first curved plate 52 and inlet 46.

Close to the outlet 48, inside the housing 44, is a second curved plate forming the valve member 56 of the second stage 54 of flow area modulation. The second curved plate 56 is shaped to complement the interior surface of the housing 44 in the vicinity of the outlet 48. The second curved plate 56 is preferably adjacent to the interior surface of the housing 44, with a clearance for movement of the second curved plate 56 relative to the housing 44. The second curved plate 56 may have a shape that complements the shape of the aperture in the housing 44 that forms the outlet 48. Alternatively, it may be larger than the outlet 48 or be smaller than the outlet 48, in which case the second stage 54 does not have a closed state. Alternatively the second curved plate 56 may have a different shape to the outlet 48.

The second curved plate 56 is further configured to be moved on a curved path defined about an axis coincident with the axis of symmetry of the housing 44. The second curved plate 56 can therefore be orientated in a position in which it does not obstruct the outlet 48 so that the flow area of the second stage 54 is maximised. The second curved plate 56 can also be orientated in a position in which it fully obstructs the outlet 48 so that the second stage 54 permits no flow to pass therethrough. The second curved plate 56 can be moved around its curved path, for example driven by a second stage actuator 60, from the position in which it does not obstruct the outlet 48 to the position in which it fully obstructs the outlet 48 in order to modulate the available flow area. Intermediate positions of the second curved plate 56 around its travel path therefore offer reduced flow area.

The movement of the second curved plate 56 around its path may be limited by end stops or by the actuation applied to it in order to reduce the range of flow area modulation provided. Alternatively, where the second curved plate 56 is smaller than the outlet 48, in at least one of the axial and circumferential directions relative to the cylindrical housing 44, there may be no position of the second curved plate 56 in which the second stage 54 is in a closed state. Where the second curved plate 56 has a different shape to the outlet 48 the flow area modulation may be non-linearly related to the position of the second curved plate 56. In this example the second stage 54 may include a closed state or may not include a closed state depending on the shapes of the second curved plate 56 and outlet 48.

The first curved plate 52 and the second curved plate 56 may be mechanically coupled together so that they rotate about a common axis that coincides with the axis of symmetry of the housing 44. The movement of the curved plates 52, 56 may therefore be driven by a common actuator 62 instead of first and second stage actuators 58, 60. Advantageously the relationship between the flow area of the first stage 50 and the flow area of the second stage 54 is predefined in this arrangement.

The bleed valve 40 shown in FIG. 5 may also include a perforate plate 66 located within the housing 44 between the first stage 50 and the second stage 54 of flow area modulation. The perforate plate 66 may bisect the housing 44 or be located closer to the first stage 50 or closer to the second stage 54. The perforate plate 66 provides an additional pressure drop across it, the magnitude of which is dependent on the size and spacing of the perforations.

Where the first curved plate 52 and second curved plate 56 are coupled together the perforate plate 66 may also be coupled to them. Thus the angle between the flow through the inlet 46 and the perforate plate 66 is changed depending on the flow area modulation of the first stage 50, as determined by the position of the first curved plate 52. Similarly the angle between the flow through the perforate plate 66 and the outlet 48 is changed depending on the flow area modulation of the second stage 54, as determined by the position of the second curved plate 56. Advantageously the perforate plate 66 is thus arranged not to impede the movement of the first and second curved plates 52, 56.

Although the perforate plate 66 has been described in relation to FIG. 5 it can be applied with equal felicity to the bleed valves 40 shown in FIG. 2 to FIG. 4.

The movement of the first and second valve members 52, 56 in any of the arrangements of bleed valve 40 may be bi-stable, discretely variable between defined open states, or continuously variable. Where they are discretely variable or continuously variable it is possible to better manage deterioration of the gas turbine engine 10 in which it is positioned. This is because when the gas turbine engine 10 is new the amount of flow area modulation may be smaller than that required when components of the gas turbine engine 10 have deteriorated. Conventionally a new bi-stable bleed valve 40 had to have a larger flow area than desirable when in its open state in order that the available flow area remained sufficient when components of the gas turbine engine 10 had deteriorated. Thus engine efficiency when new was sacrificed to accommodate deterioration of the gas turbine engine 10 before maintenance activities. By strategic management of the degradation of the gas turbine engine 10, the bleed valve 40 aims to maximise the efficiency of the engine throughout its life.

Although the housing 44 has been described as cylindrical it may alternatively be a different shape. For example it may be frustoconical with the wider end proximal to the air source 34 or proximal to the air sink 42. The housing 44 may be a prism with a different cross-sectional shape, for example a square or rectangular-based prism, a triangular prism or a prism based on a multi-sized polygon. The housing 44 may have greater diameter proximal to the air source 34 or proximal to the air sink 42. Advantageously the shape of the housing 44 can be matched to the available space. Advantageously the shape of the inlet 46 and the shape of the outlet 48 may each be optimised for their functions and for the particular second valve members 56 chosen. For example, where the second valve members 56 are provided as louvers it is more effective to provide a rectangular outlet 48. It may be beneficial to provide the inlet 46 to the bleed valve 40 in a race track shape.

Where the first stage 50 and second stage 54 are controlled to provide a continuously variable flow area modulation the bleed valve 40 is more efficient than conventional arrangements because the minimum quantity of air necessary may be extracted from the air source, such as compressor stage 34. The bleed valve 40 is also quieter than conventional arrangements because less air is extracted and the pressure drop across the first stage 50 and second stage 54 is equalised. Where the perforate plate 66 is provided between the first and second stages 50, 54 additional pressure drop is provided which further reduces the noise signature of the bleed valve 40.

The first stage 50 and second stage 54 of flow area modulation may be controlled actively or passively. They may be controlled separately by first stage and second stage actuators 58, 60 or jointly by a common actuator 62. Only one of the first stage 50 and second stage 54 may be controlled, the other of the first stage 50 and second stage 54 being actuated by a couple to the controlled stage 50, 52, for example a mechanical, electrical or electronic couple.

Both the first stage 50 and the second stage 54 may comprise a closed state or only one of the stages 50, 54 may comprise a closed state, the other of the stages 50, 54 having a plurality or continuum of open states.

The bleed valve 40 has been described in relation to a gas turbine engine 10. Such a gas turbine engine 10 may be used for powering an aircraft, for marine applications, or for industrial applications such as pumping oil and gas and providing land-based power.

The invention claimed is:

1. A bleed valve for a gas turbine engine, the bleed valve comprising:
    an inlet coupled to an air source;
    an outlet coupled to an air sink;
    a first stage of flow area modulation between the inlet and the outlet;
    a second stage of flow area modulation between the first stage and the outlet; and
    a controller to control the modulation of the flow area of at least one of the first stage and second stage, wherein the controller is configured to equalise the pressure drop across the first stage and the second stage.

2. A bleed valve as claimed in claim 1 wherein the first stage comprises any of the group comprising: a bi-stable valve that is open or closed; a discretely variable valve that has a plurality of open states; a continuously variable valve; a butterfly valve; a flap valve; a ball valve; a shaped port; one or more louvers.

3. A bleed valve as claimed in claim 1 wherein the second stage comprises any of the group comprising: a bi-stable valve that is open or closed; a discretely variable valve that has a plurality of open states; a continuously variable valve; a shaped port; one or more louvers; a sliding cover; a variable iris; a temperature controlled shape memory alloy variable area structure; a pressure controlled elastically deformable variable area structure.

4. A bleed valve as claimed in claim 1 wherein the controller is configured to control the first stage and the second stage.

5. A bleed valve as claimed in claim 1 wherein the controller is an active controller.

6. A bleed valve as claimed in claim 1 wherein the controller is a passive controller.

7. A bleed valve as claimed in claim 1 wherein the controller is mechanical; electrical; electronic; implemented in software.

8. A bleed valve as claimed in claim 1 wherein the controller is located remotely from the bleed valve.

9. A bleed valve as claimed in claim 1 further comprising a perforate plate between the first stage and the second stage.

10. An arrangement comprising:
    a plurality of bleed valves, each as claimed in claim 1; and
    a controller to control the flow area of at least one of the first and second stages of each bleed valve.

11. An arrangement as claimed in claim 10 wherein the controller is configured to control the flow area of the first and second stages of each bleed valve.

12. An arrangement as claimed in claim 10 wherein the controller is configured to control any number of the plurality of bleed valves to be closed, partially open or fully open.

13. A gas turbine engine comprising an arrangement as claimed in claim 10.

14. A gas turbine engine comprising a bleed valve as claimed in claim 1.

15. A gas turbine engine as claimed in claim 14 wherein the air source comprises a compressor stage or a turbine stage.

16. A gas turbine engine as claimed in claim 14 wherein the air sink comprises a turbine stage; a cooling air reservoir; a bypass duct; overboard of the gas turbine engine.

17. A gas turbine engine comprising an array of bleed valves, each bleed valve as claimed in claim 1.

18. A gas turbine engine as claimed in claim 14 wherein the array is an annular array; an axial array; or an array that is annular and axial.

* * * * *